United States Patent [19]

Maeroff

[11] 4,323,166
[45] Apr. 6, 1982

[54] FILLER PIPE SEAL WITH FILL CONTROL SKIRT

[75] Inventor: Bruce J. Maeroff, Dearborn, Mich.

[73] Assignee: Ford Motor Company, Dearborn, Mich.

[21] Appl. No.: 83,013

[22] Filed: Oct. 9, 1979

[51] Int. Cl.³ .............................................. B65D 25/20
[52] U.S. Cl. ..................................... 220/86 R; 16/2; 285/162
[58] Field of Search ............. 220/86 R; 280/5 R, 5 A; 285/162, 96, 338; 16/2

[56] References Cited

U.S. PATENT DOCUMENTS

| | | |
|---|---|---|
| 562,074 | 6/1896 | Fowler . |
| 1,360,406 | 11/1920 | Hushes et al. . |
| 2,039,009 | 4/1936 | Lampman et al. . |
| 2,104,461 | 1/1938 | Holm . |
| 2,241,293 | 5/1941 | Campbell . |
| 2,466,076 | 4/1949 | Bentley et al. . |
| 2,514,504 | 7/1950 | Moline . |
| 2,708,594 | 5/1955 | MacPherson . |
| 2,779,498 | 1/1957 | Cole et al. . |
| 3,334,779 | 8/1967 | Smith . |
| 3,384,392 | 5/1968 | Gilchrist . |
| 3,424,857 | 1/1969 | Miller et al. . |
| 3,518,359 | 6/1970 | Trimble et al. . |
| 3,542,278 | 11/1970 | Deaver ................................ 229/7 S |
| 3,805,829 | 4/1974 | Yamamoto et al. . |
| 3,885,547 | 5/1975 | Doepke et al. . |
| 3,917,109 | 11/1975 | MacDonald ................... 137/587 X |
| 4,057,269 | 11/1977 | Bislew . |
| 4,079,952 | 3/1978 | Nishio et al. . |
| 4,088,241 | 5/1978 | Hall et al. ........................ 220/86 R |

FOREIGN PATENT DOCUMENTS 437395  10/1935  United Kingdom ............ 220/86 R

Primary Examiner—Allan N. Shoap
Attorney, Agent, or Firm—Steven L. Permut; Clifford L. Sadler

[57] ABSTRACT

A filler pipe seal having an annular body forming an interference fit between a filler pipe and fuel tank with an integral tubular skirt depending from the annular body and extending into the fuel tank beyond the open lower end of the filler pipe to provide precisely determined fuel tank capacity defined by the lower end of the tubular skirt.

6 Claims, 2 Drawing Figures

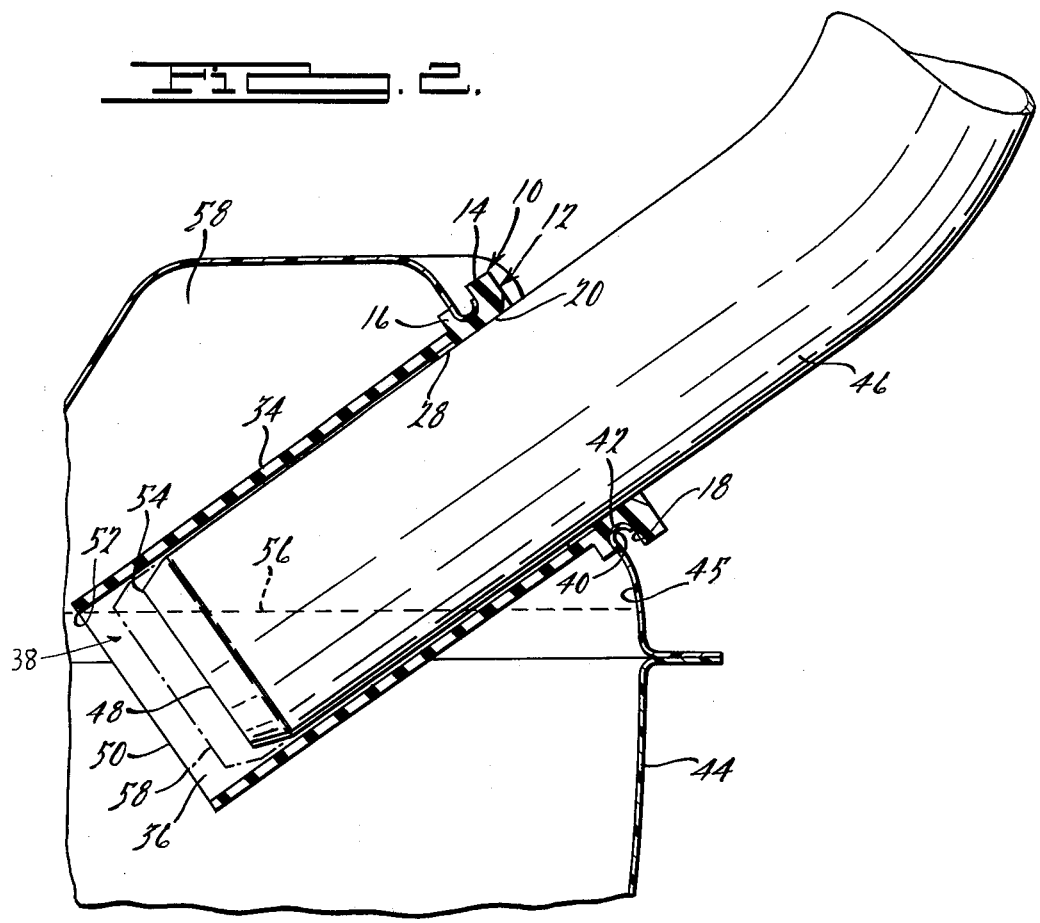
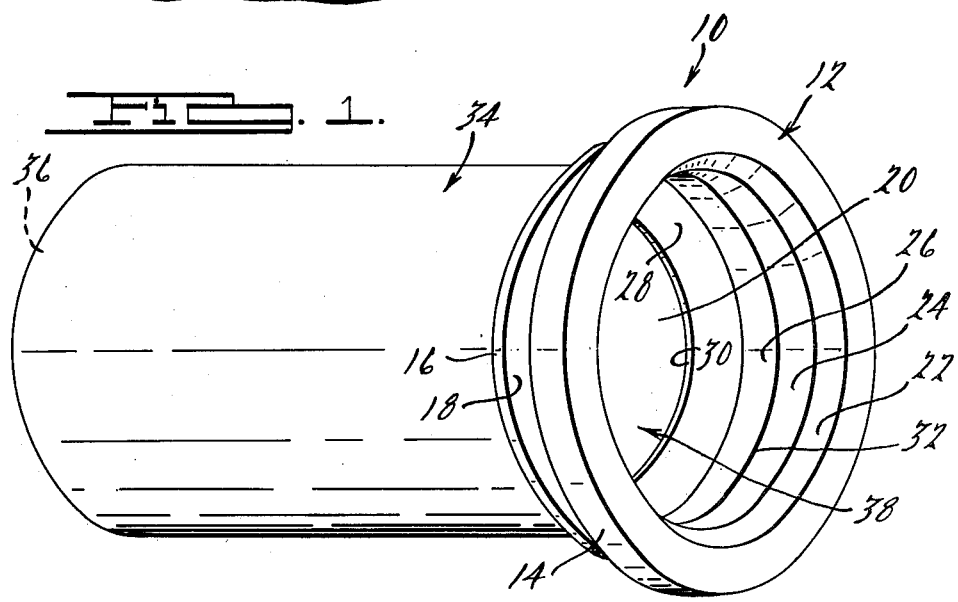

FILLER PIPE SEAL WITH FILL CONTROL SKIRT

BACKGROUND OF THE INVENTION

1. Field of the Invention.

This invention relates to filler pipe seals and more particularly filler pipe seals with a fill control skirt.

2. Description of the Prior Art.

Filler pipe seals have been known to sealingly connect a filler pipe to a fuel tank while allowing the filler pipe to slide into the fuel tank without disrupting the seal. These types of seals, made from elastomeric material, are found in many motor vehicles. One seal is disclosed in U.S. Pat. No. 4,088,241 issued on May 9, 1978 to Hall et al.

In the present fuel tank systems, the intruding end of the filler pipe determines the level at which fuel fills the tank. Trapped air in the tank, above the filler pipe end prevents fuel from completely filling the tank. Once the fuel level is at the end of the filler pipe end, the introduction of more fuel merely fills the filler pipe.

The conventional filler pipe seal, because it provides a sliding fit between the fuel tank and intruding end of the filler pipe, does not provide an accurate positioning means between the filler pipe and fuel tank. Due to manufacturing tolerances, the filler pipe intruding end may be set too low or too high from its intended position.

The manufacturing tolerance stack-up of a motor vehicle with a fuel tank and filler pipe can cause significant variations in the amount the end of the filler pipe intrudes within the fuel tank from one motor vehicle to the other to undesirably change the fuel tank capacity. If the filler pipe intrudes too deeply in the fuel tank, the fuel tank capacity is diminished and if the filler pipe is shortened so that it does not intrude enough, the fuel tank capacity is undesirably enlarged. Consequently, in mass production, two vehicles, both being the same design, can have fuel tanks with different fuel capacities.

It is desirable to build a fuel tank-filler pipe assembly that has a precise predetermined capacity while maintaining the sliding fit of the filler pipe into the fuel tank opening. Such an assembly is desired so that all fuel tanks of one motor vehicle model can be accurately standardized.

SUMMARY OF THE DISCLOSURE

In accordance with the invention, a fill tank filler pipe seal comprises a resilient deformable annular body for use about a filler pipe intruding into the fuel tank through an aperture in the fuel tank. The annular body is coaxially mountable about the filler pipe and insertable within the aperture of the fuel tank. The annular body seals the gap between the filler pipe and fuel tank aperture.

In addition, a downwardly depending tubular skirt portion of a predetermined length is suspendible into the fuel tank such that the lower end of the tubular skirt extends below the lower end of the filler pipe.

In one embodiment, the downwardly depending tubular skirt is integrally formed with the elastomeric annular body.

BRIEF DESCRIPTION OF THE DRAWINGS

The invention will now be described with reference to the following drawings in which;

FIG. 1 is a perspective view of one embodiment of the invention; and

FIG. 2 is a side elevational partially segmented view showing the embodiment shown in FIG. 1 in position mounting a filler pipe to a fuel tank.

DETAILED DESCRIPTION OF THE PREFERRED EMBODIMENT

Referring to FIG. 1, a fuel tank filler pipe seal 10 has an annular body 12 and a depending tubular skirt portion 34, a passage 38 is defined through the annular body 12 and tubular skirt portion 34. The annular body 12 has an enlarged outer flange 14 and a smaller inner flange 16 defining an annular groove 18 therebetween. The annular body 12 has a central aperture 20 defined by steeply inclined frustoconical surface 22 continuous with less inclined frustoconical surface 24 and more inclined frustoconical inner surface 26.

The surfaces 24 and 26 define an apex 32 therebetween which constricts the diameter of aperture 20. In addition, a thin flexible annular diaphragm 28 extends into passage 38 and has a central aperture 30 therethrough.

A tubular skirt portion 34 is integrally formed from with the annular body 12 has a defined central aperture 36 which forms the bottom portion of passage 38 through the filler pipe seal 10.

As shown in FIG. 2, the annular body 12 has annular groove 18 fitting within the curved flange 40 about an inclined opening 42 of a fuel tank 44. The outer flange 14 of the annular body 12 extends to the exterior side of the fuel tank 44 and radially outward of the fuel tank aperture 42. The inner flange 16 abuts the interior surface 45 of the fuel tank about opening 42.

A filler pipe 46 extends within aperture 20 of the annular body 12 and compresses the ridge 32 to form an interference fit of the seal between the fuel tank opening 42 and filler pipe 46. In addition, the diaphragm 28 is outwardly flexed by the filler pipe 46 to form a seal between the filler pipe 46 and seal 10.

The end 48 of the filler pipe 46 extends into the fuel tank. The integral skirt portion 34 of filler seal 10 extends into the fuel tank coaxially about the filler pipe and extends such that the lower end 50 of the skirt 34 extends below the end 48 of filler pipe 46. The filler pipe and skirt portion angle downwardly into the fuel tank such that end 50 of skirt portion 34 has a top point 52 which is set lower than a top point 54 at end 48 of filler pipe 46.

In this fashion, as fuel enters the fuel tank through filler pipe 46, the fuel tank will have a capacity level defined by line 56 which is precisely determined by location of point 52 on end 50 of tubular skirt 34. The tubular skirt 34 by extending beyond the lower end of the filler tube allows for greater manufacturing tolerances between the filler pipe 46 and fuel tank 44. In effect, the filler pipe 46 can have its end 48 positioned anywhere above a position defined by dotted line 58 within skirt 34 without affecting the fuel tank capacity. In addition the filler pipe 46 maintains a sliding interference fit with the fuel tank 44 provided by the annular body 12 of filler pipe seal 10.

The filler pipe seal with the skirt portion is particularly useful when the fuel tank is being filled by an automatic gasoline pump which depends upon back pressure for an automatic cutoff. When the fuel reaches the level as defined by line 56, the back pressure will greatly increase to shut off the automatic pump when the fuel tank is filled to the precisely predetermined level.

Further filing of the filler pipe 46 will cause the fuel to rise within the filler pipe 46 without raising the level of the fuel within tank 44 as defined by line 56 due to the enclosure of the fuel tank 44 and the air pressure in the upper portion 58 therein.

Variations and modifications of the present invention are possible without departing from its spirit and scope as defined in the appended claims.

The embodiments in which an exclusive privilege or property right is claimed are defined as follows:

1. A fuel tank filler pipe seal comprising;
   a resilient deformable annular body for use between a fuel tank and a filler pipe intruding into said fuel tank through an opening;
   said annular body coaxially mountable about said filler pipe within said opening of said fuel tank;
   means on said annular body for making a seal between said pipe and fuel tank;
   a downwardly depending tubular skirt portion of predetermined length extendable into said tank with a lower end of said skirt extendable below the end of said filler pipe such that said lower end of said skirt controls the amount of fuel into said fuel tank before said filler pipe becomes filled with said fuel.

2. A fuel tank-filler pipe seal as defined in claim 1 wherein;
   said depending tubular skirt is integrally formed with said annular body.

3. A fuel tank assembly comprising;
   a motor vehicle fuel tank having an opening therethrough;
   a filler pipe intruding into said fuel tank through said opening
   said filler pipe having an intruding lower end;
   a resilient deformable annular seal between said filler pipe and said fuel tank about said opening;
   a tubular skirt portion depending downwardly from said annular seal and coaxially positioned about said filler pipe and having an end extended below said intruding lower end of said filler pipe such that the capacity of said fuel tank is defined by the level of said end of said skirt portion.

4. A fuel tank assembly defined in claim 3 wherein;
   the lower extruding end of said filler pipe is inclined from the horizontal position having an upper point;
   the end of said tubular skirt portion is inclined from the horizontal position having an upper point;
   said upper point of said tubular skirt end is positioned lower than said upper point of said filler pipe lower intruding end within said fuel tank.

5. A fuel tank assembly defined in claim 4 wherein;
   said opening in said fuel tank lies in an inclined plane;
   said filler pipe intruding through said opening normal to said inclined plane;
   said skirt portion angled downward normal to said inclined plane.

6. A fuel tank assembly as defined in claims 3, 4 or 5 with said skirt portion integrally formed with said annular seal from a resilient elastomeric material.

* * * * *